United States Patent
Takahashi (10) Patent No.: US 9,756,196 B2
(45) Date of Patent: Sep. 5, 2017

(54) IMAGE PROCESSING APPARATUS AND SYSTEM AND METHOD FOR TRANSMITTING AN IMAGE

(71) Applicants: KABUSHIKI KAISHA TOSHIBA, Tokyo (JP); TOSHIBA TEC KABUSHIKI KAISHA, Tokyo (JP)

(72) Inventor: Kazunobu Takahashi, Suntou Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/157,781

(22) Filed: May 18, 2016

(65) Prior Publication Data
US 2016/0269574 A1     Sep. 15, 2016

Related U.S. Application Data

(63) Continuation of application No. 14/455,779, filed on Aug. 8, 2014, now Pat. No. 9,374,480.

(51) Int. Cl.
*H04N 1/00* (2006.01)
*H04N 1/44* (2006.01)
*H04N 1/32* (2006.01)

(52) U.S. Cl.
CPC ..... *H04N 1/00212* (2013.01); *H04N 1/00214* (2013.01); *H04N 1/00241* (2013.01); *H04N 1/00328* (2013.01); *H04N 1/00795* (2013.01); *H04N 1/32037* (2013.01); *H04N 1/32101* (2013.01); *H04N 1/32128* (2013.01); *H04N 1/32523* (2013.01); *H04N 1/4433* (2013.01); *H04N 2201/0039* (2013.01); *H04N 2201/0094* (2013.01)

(58) Field of Classification Search
USPC ......................................................... 358/1.15
See application file for complete search history.

(56) References Cited

U.S. PATENT DOCUMENTS

| | | | | |
|---|---|---|---|---|
| 7,769,814 B2* | 8/2010 | Wu | ......................... | H04L 51/02 709/204 |
| 8,194,257 B2* | 6/2012 | Kuchibhotla | ...... | H04N 1/00358 358/1.13 |
| 8,887,262 B1* | 11/2014 | Turner | ................ | H04L 63/0853 709/220 |
| 2001/0032243 A1* | 10/2001 | Ogawa | .................... | H04L 67/42 709/206 |
| 2002/0015175 A1 | 2/2002 | Katsuda | | |

(Continued)

FOREIGN PATENT DOCUMENTS

JP     2010-130662     6/2010

*Primary Examiner* — Jerome Grant, II
(74) *Attorney, Agent, or Firm* — Patterson & Sheridan, LLP (57) ABSTRACT

An image processing apparatus according to an embodiment includes a reading unit that reads an image from a sheet to generate image data. A code generation unit generates a code representing an email address of the image processing apparatus. A display unit displays the code. A control unit receives an email transmitted from a transmission source to the email address of the image processing apparatus and transmits an email with the image data attached to an email address of the transmission source.

20 Claims, 10 Drawing Sheets

(56) References Cited

U.S. PATENT DOCUMENTS

| | | | |
|---|---|---|---|
| 2006/0009730 A2* | 1/2006 | Shevlin | A61N 1/30 604/20 |
| 2006/0129592 A1* | 6/2006 | Poozhiyil | G06Q 10/107 |
| 2007/0192424 A1* | 8/2007 | Minato | H04L 12/5835 709/206 |
| 2008/0148370 A1 | 6/2008 | Allwright | |
| 2008/0225335 A1* | 9/2008 | Shozaki | H04L 12/185 358/1.15 |
| 2013/0043302 A1* | 2/2013 | Powlen | G06Q 50/01 235/375 |
| 2013/0250324 A1 | 9/2013 | Tse | |
| 2013/0317835 A1* | 11/2013 | Mathew | G06Q 30/02 705/2 |
| 2013/0343645 A1* | 12/2013 | Dalal | G06K 7/1408 382/162 |
| 2014/0168716 A1* | 6/2014 | King | G06Q 10/10 358/473 |
| 2014/0195928 A1* | 7/2014 | Carlen | G06F 3/0484 715/752 |
| 2014/0229550 A1* | 8/2014 | Tredoux | H04L 51/08 709/206 |
| 2014/0237379 A1 | 8/2014 | Chuch et al. | |
| 2014/0245019 A1 | 8/2014 | Hwang et al. | |
| 2014/0281936 A1 | 9/2014 | Wallis et al. | |
| 2014/0363057 A1 | 12/2014 | Eckel et al. | |
| 2015/0012296 A1* | 1/2015 | Gibson | G06F 19/321 705/3 |
| 2015/0094106 A1* | 4/2015 | Grossman | H04W 4/12 455/466 |
| 2015/0103208 A1 | 4/2015 | Tsuchida et al. | |
| 2016/0088102 A1* | 3/2016 | Zabaluev | H04L 67/22 715/736 |
| 2016/0088144 A1* | 3/2016 | Logan | H04M 1/72552 455/412.1 |
| 2016/0292428 A1* | 10/2016 | Brady | G06F 21/10 |
| 2016/0308807 A1* | 10/2016 | Zhang | G06F 21/604 |
| 2016/0314329 A1* | 10/2016 | Papazian | G06K 19/06037 |
| 2017/0017946 A1* | 1/2017 | Nimiya | G06Q 20/18 |
| 2017/0046729 A1* | 2/2017 | Breslin | G06Q 30/02 |

* cited by examiner

| IMAGE ID | IMAGE PATH |
|---|---|
| J4294opa02 | /image/imagefile20140310113819.dat |
| 39jafdp202 | /image/imagefile20140310121512.dat |
| ... | ... |

| DEVICE ID | ADDRESS INFORMATION |
|---|---|
| IMAGE STORAGE DEVICE A | 192.168.0.1 |
| IMAGE STORAGE DEVICE B | 192.168.0.2 |
| ... | ... |

IMAGE PROCESSING APPARATUS AND SYSTEM AND METHOD FOR TRANSMITTING AN IMAGE

CROSS-REFERENCE TO RELATED APPLICATION

This application is a continuation of U.S. patent application Ser. No. 14/455,779, filed on Aug. 8, 2014, the entire contents of each of which are incorporated herein by reference.

BACKGROUND

In the related art, a user may be provided with data of an image taken by an image processing apparatus such as a scanner using means such as an electronic mail, and a file server. In the following description, the electronic mail is referred to as "email". When using these means, a user needs to input information such as a destination of the email, and a saving destination of the image data into the scanner. Alternatively, the user needs to select this information from information set in advance. Therefore, in a method of providing image data using email, there is a possibility that workload of a user increases.

DETAILED DESCRIPTION

An image processing apparatus according to an embodiment includes a reading unit that reads an image from a sheet to generate image data. A code generation unit generates a code representing an email address of the image processing apparatus. A display unit displays the code. A control unit receives an email transmitted from a transmission source to the email address of the image processing apparatus and transmits an email with the image data attached to an email address of the transmission source.

Hereinafter, an image processing apparatus of an embodiment will be described referring to drawings.

(First Embodiment)

Figure 1:
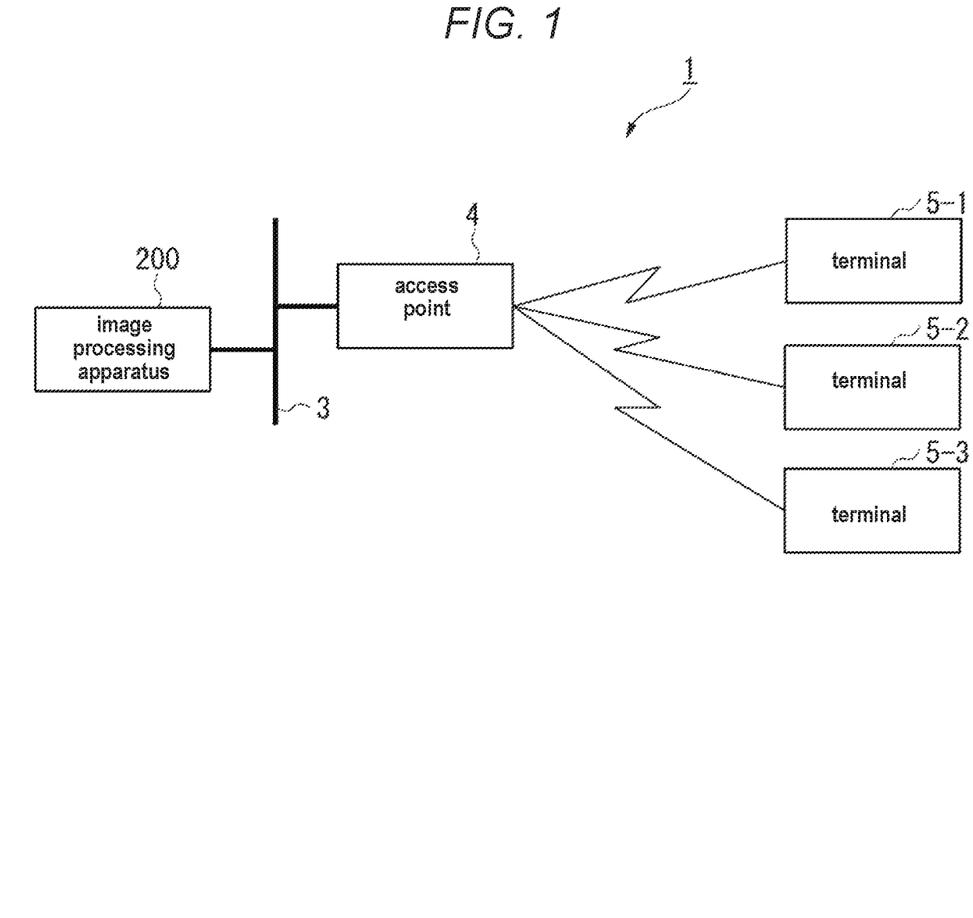
FIG. 1 is a diagram illustrating a configuration of an image processing system according to a first embodiment.

FIG. 1 is a diagram illustrating a configuration of an image processing system 1 of a first embodiment.

The image processing system 1 includes an image processing apparatus 200, a network 3, an access point 4 and user terminals 5-1 to 5-3.

The image processing apparatus 200 reads an image on a sheet (which is an object to be read) to generate digital data (hereinafter, referred to as "image data"). For example, the image processing apparatus 200 is a device such as a Multi-Function Printer (MFP), or a scanner. In the following description, the multi-function printer will be described as an example. The sheet may be any substance that the image processing apparatus 200 may read. For example, the sheet is a document on which a character and the like are printed. Moreover, for example, the sheet is paper on which a picture and the like are printed. The image processing apparatus 200 is connected to the network 3 and communicates with user terminals 5-1 to 5-3 through the access point 4.

The network 3 is a communication network such as Local Area Network (LAN), and Wide Area Network (WAN).

An access point 4 is an access point which accommodates user terminals 5-1 to 5-3 in a network of the image processing apparatus. The access point 4 relays communications between equipment belonging to the network 3 and the user terminals 5-1 to 5-3.

The user terminals 5-1 to 5-3 are terminals used by a user to acquire image data using the image processing apparatus 200. In the following description, when not particularly distinguished, the user terminals 5-1 to 5-3 are referred to as the user terminal 5. For example, the user terminal 5 is information equipment such as a Personal Computer (PC), a smart phone, a tablet, or a mobile phone. The user terminal 5 communicates with the image processing apparatus 200 through the access point 4. The number of the user terminals 5 may be different the number shown in FIG. 1.

Figure 2:
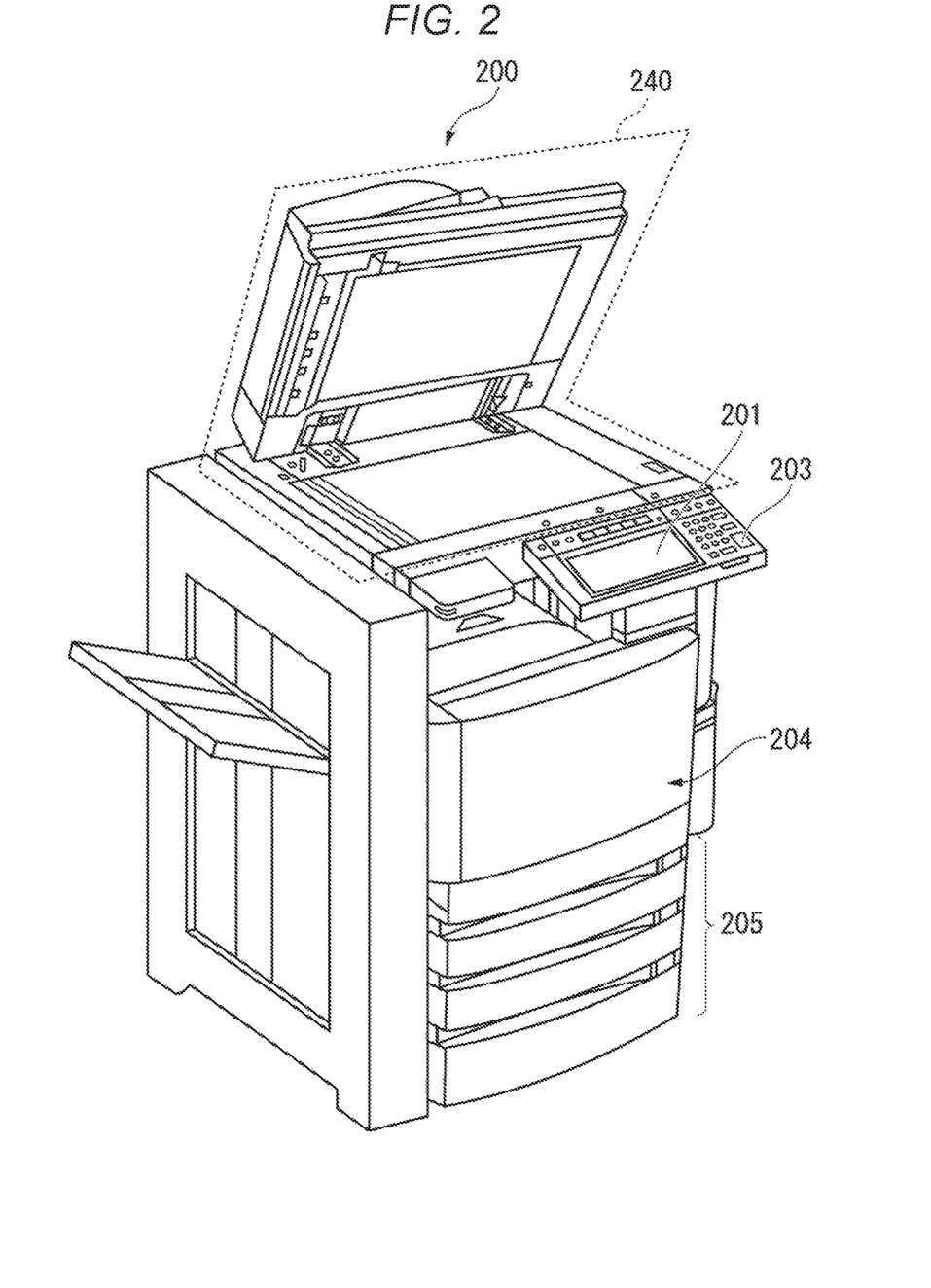
FIG. 2 is an external view illustrating an example of an image processing apparatus usable in the first embodiment.

FIG. 2 is an external view illustrating an example of the image processing apparatus 200.

The image processing apparatus 200 includes a display 201, a control panel unit 203, a printing unit 204, a paper tray 205, and an image reading unit 240. The printing unit 204 of the image processing apparatus 200 may be a device which fixes a toner image or it may be an ink jet type device.

Figure 3:
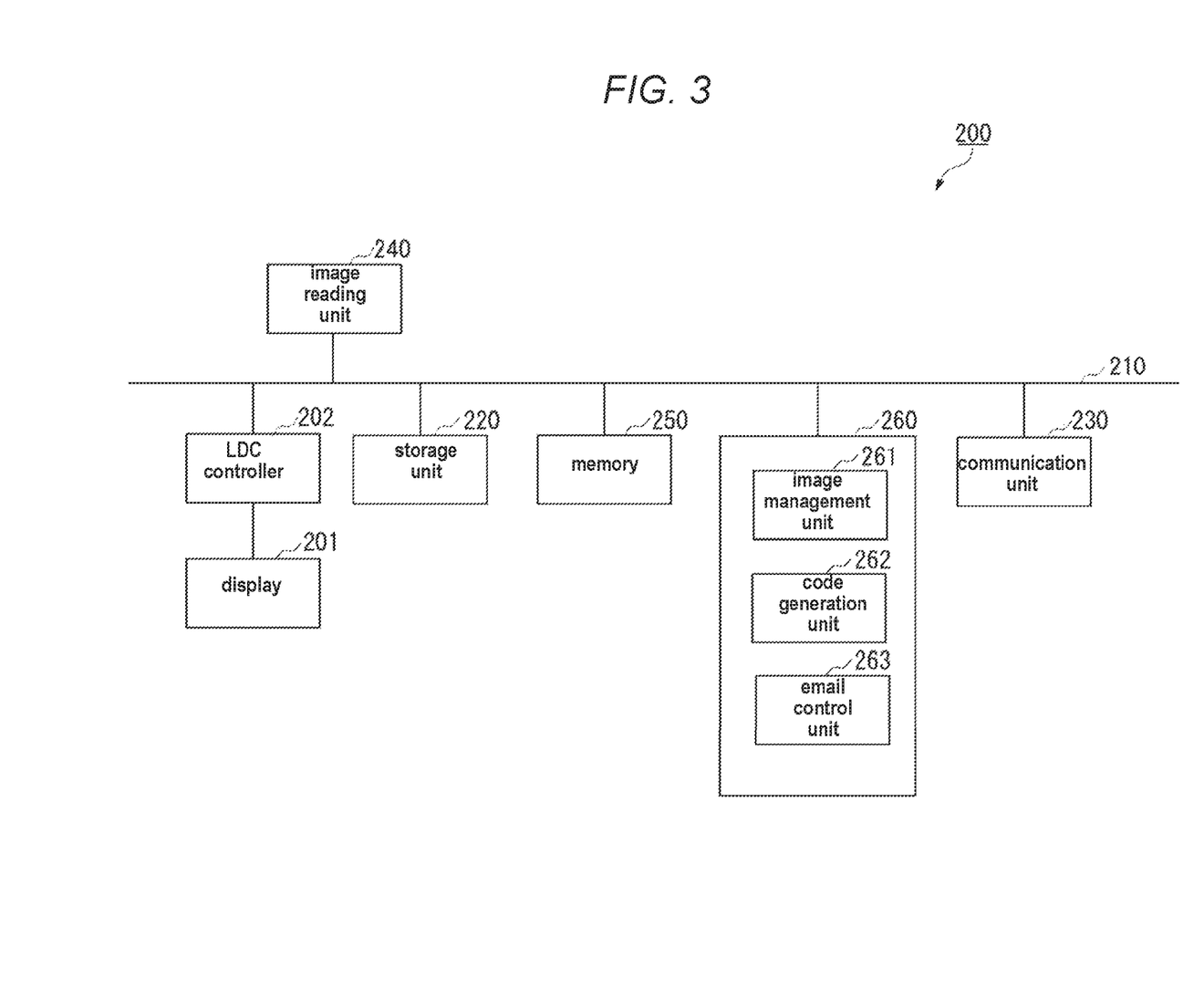
FIG. 3 is a block diagram illustrating a functional configuration of the image processing apparatus, according to the first embodiment.

FIG. 3 is a block diagram illustrating a functional configuration of the image processing apparatus 200.

The image processing apparatus 200 includes a memory 250 and a Central Processing Unit (CPU) 260. The memory 250 and the CPU 260 are connected by a bus 210. The CPU 260 reads a multifunction printer program in the memory 250 and executes the program. In addition, the image processing apparatus 200 includes a display 201, a Liquid Crystal Display (LCD) controller 202, a storage unit 220, a communication unit 230, an image reading unit 240, an image management unit 261, a two-dimensional code generation unit 262, and an email control unit 263. The multifunction printer program controls each functional unit described above.

All or a part of each function of the image processing apparatus 200 may be achieved using hardware such as an Application Specific Integrated Circuit (ASIC), a Programmable Logic Device (PLD), and a Field Programmable Gate Array (FPGA). Moreover, the multifunction printer program may be recorded on a computer-readable recording medium. For example, the compute-readable recording medium may be a portable medium such as a flexible disk, a magneto-optical disk, a ROM, or a CD-ROM. In addition, for example, the computer-readable recording medium may be a storage device such as a hard disk embedded in a computer system. The multifunction printer program may be transmitted through an electric communication circuit.

The display 201 operates as an output interface to display a character, an image, and the like. In addition, the display 201 operates as an input interface to receive an input from a user. For example, the display 201 is a liquid crystal display including a touch panel. The LCD controller 202 controls operations of the display 201.

The storage unit 220 includes a storage device such as a magnetic hard disk device, and a semiconductor memory device. The storage unit 220 stores image data acquired by the image reading unit 240. In addition, the storage unit 220 stores an image management table 221.

Figure 4:
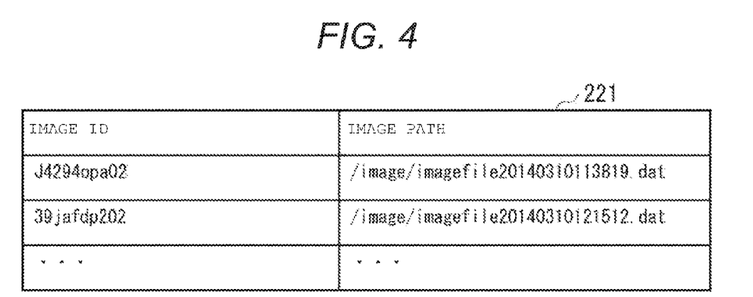
FIG. 4 illustrates an example of an image management table, according to the first embodiment.

FIG. 4 is a diagram illustrating a detailed example of the image management table 221.

The image management table 221 includes an image management record for each image ID. The image management record includes an image ID and an image path. The image ID includes identification information of an image (hereinafter, referred to as "image information") acquired by the image reading unit 240. The image path includes information on a path (hereinafter, referred to as "path information") in which image data represented by the image ID is stored. The image management record is registered to the image management table 221 by the image management unit 261. The description now returns to FIG. 3.

The communication unit 230 includes a communication interface such as a LAN. The communication unit 230 transmits or receives data to or from other devices such as the access point 4, and the user terminal 5.

The image reading unit 240 includes an image reading sensor, which may be, for example, a Contact Image Sensor (CIS) or a Charge Coupled Device (CCD). The image reading unit 240 reads an image appearing on a sheet using the image reading sensor to generate image data. The image reading unit 240 outputs the generated image data to the image management unit 261.

The memory 250 includes a storage device such as a Random Access Memory (RAM). The memory 250 temporarily stores data used by each portion included in the image processing apparatus 200.

The CPU 260 operates as a control unit for performance of a multifunction printer program. The CPU 260 controls operations of each portion of the image processing apparatus 200.

The image management unit 261 acquires image data generated by the image reading unit 240. The image management unit 261 generates image information and path information regarding the acquired image data. The image management unit 261 outputs the image data to the storage unit 220 and stores the image data in a location represented by the generated path information. The image management unit 261 generates an image management record which includes image information of the acquired image data and path information for storing the image data. The image management unit 261 registers the generated image management record in the image management table 221.

The two-dimensional code generation unit 262 generates a two-dimensional code which represents any text information. The two-dimensional code is a code which has information in a horizontal direction and a vertical direction such as a Quick Response (QR) code (registered trademark, the same hereinafter). For example, the two-dimensional code generation unit 262 generates a two-dimensional code which represents image information and destination information. The destination information is information which is used when a user terminal 5 transmits an email to the image processing apparatus. For example, the destination information is an email address of the image processing apparatus. The two-dimensional code generation unit 262 outputs the generated two-dimensional code to the LCD controller 202 to be displayed on the display 201.

The email control unit 263 receives email transmitted to an email address of the image processing apparatus from the user terminal 5. The email control unit 263 acquires image data represented by image information included in the received email from the storage unit 220. The email control unit 263 generates email for transmitting the image data to the user terminal 5. The email control unit 263 attaches the acquired image data to the generated email. The email control unit 263 transmits the email to which the image data is attached to an email address of a transmission source of the received email.

Figure 5:
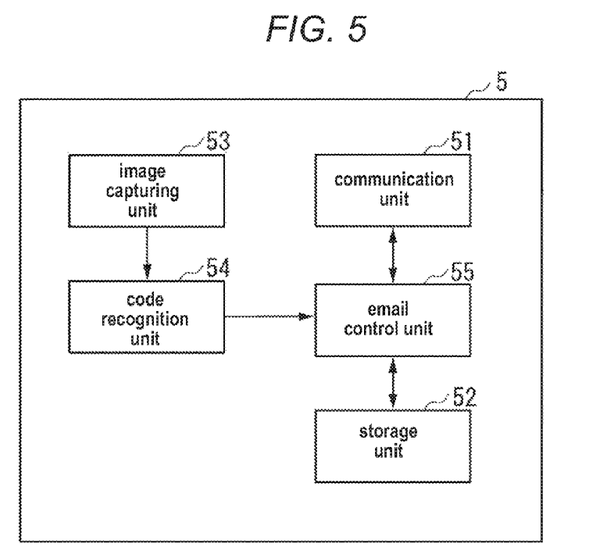
FIG. 5 is a block diagram illustrating a functional configuration of a user terminal, according to the first embodiment.

FIG. 5 is a functional block diagram illustrating a functional configuration of the user terminal 5.

The user terminal 5 includes a CPU, a memory, an auxiliary storage device and the like. The CPU and the memory are connected by a bus. The CPU reads a user terminal program in a memory and performs the program. In addition, the user terminal 5 includes a communication unit 51, a storage unit 52, an image capturing unit 53, a two-dimensional code recognition unit 54, and an email control unit 55. The user terminal program controls each functional unit described above.

All or a portion of each function of the user terminal 5 may be achieved using hardware such as an ASIC, PLD, and FPGA. The user terminal program may be recorded on a computer-readable recording medium. For example, the computer-readable recording medium may be a portable medium such as a flexible disk, magneto-optical disk, a ROM, or a CD-ROM. Moreover, for example, the computer-readable recording medium may be a storage device such as hard disk embedded in a computer system. A user terminal program may be transmitted through the electric communication circuit.

The communication unit 51 includes a communication interface such as a LAN. The communication unit 51 communicates with the access point 4.

The storage unit 52 includes a storage device such as a magnetic hard disk device, and a semiconductor memory device. The storage unit 52 stores image data acquired from the image processing apparatus 200.

The image capturing unit 53 includes a device having a capturing function of a camera and the like. The image capturing unit 53 captures a space corresponding to a position of the user terminal 5. The image capturing unit 53 acquires an image of a space in which a two-dimensional code is displayed by a capturing operation of a user. Hereinafter, in order to be distinguished from the image data acquired by the image processing apparatus 200, an image acquired by the image capturing unit 53 is described as a captured image. The image capturing unit 53 outputs the acquired captured image to the two-dimensional code recognition unit 54.

The two-dimensional code recognition unit 54 reads information represented by a two-dimensional code from a captured image. More specifically, the two-dimensional code recognition unit 54 detects the two-dimensional code from the captured image. The two-dimensional code recognition unit 54 acquires image information and destination information represented by the detected two-dimensional code. The two-dimensional code recognition unit 54 outputs the image information and the destination information to the email control unit 55.

The email control unit 55 transmits an email to the image processing apparatus 200 based on the image information and the destination information. More specifically, when the image information and the destination information are output from the two-dimensional code recognition unit 54, the email control unit 55 generates an email including the image information in a text. The email control unit 55 transmits the generated email to an email address of a destination represented by the destination information.

Figure 6:
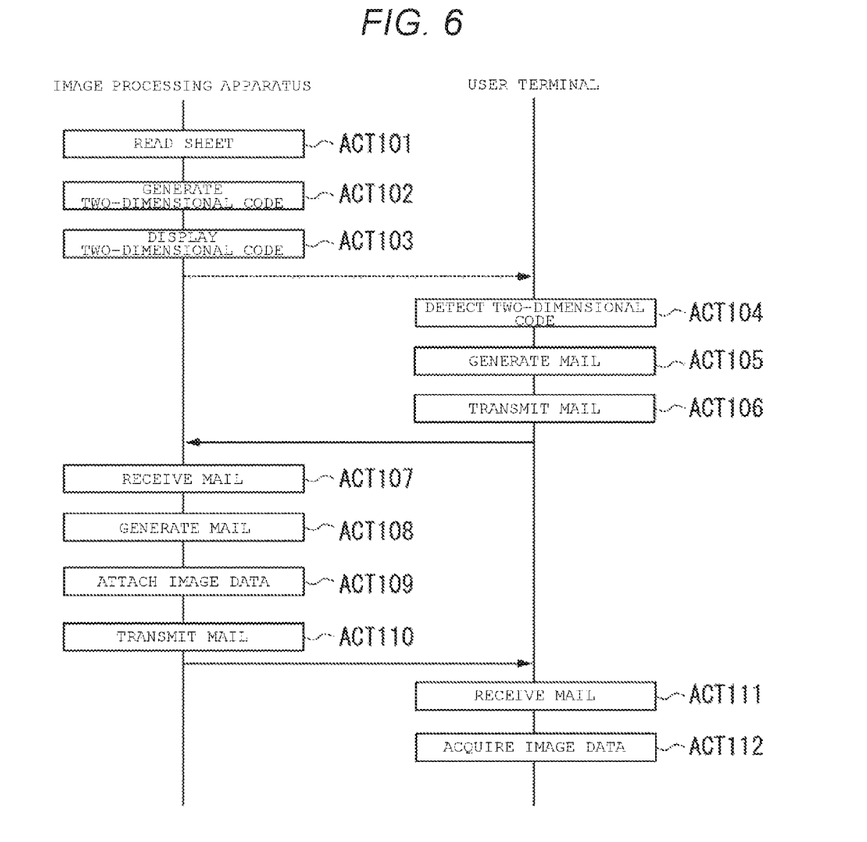
FIG. 6 is a flowchart illustrating a flow of transmission processing of image data in the image processing system, according to the first embodiment.

FIG. 6 is a flowchart illustrating a flow of transmission processing of image data in an image processing system 1 according to the first embodiment.

First, a user sets a sheet (which is an object to be read) in an image reading unit 240 of the image processing apparatus 200. The image reading unit 240 reads an image of the set sheet (ACT101), and generates image data. The image reading unit 240 outputs the acquired image data to the image management unit 261.

The image management unit 261 generates image information and path information for the acquired image data. The image management unit 261 outputs the image data to the storage unit 220 and stores the image data in a location represented by the path information. The image management unit 261 generates an image management record which includes the image information and the path information. The image management unit 261 registers the generated image management record in the image management table 221.

Next, the two-dimensional code generation unit 262 generates a two-dimensional code which represents the image information and the destination information (ACT102). The two-dimensional code generation unit 262 outputs the generated two-dimensional code to the LCD controller 202. The LCD controller 202 displays the two-dimensional code on the display 201 (ACT103).

A user inputs an operation to capture the two-dimensional code displayed on the display 201 using the user terminal 5. The image capturing unit 53 of the user terminal 5 captures an image of a space in which the image processing apparatus is placed by a capturing operation initiated by the user. The image capturing unit 53 outputs the acquired captured image to the two-dimensional code recognition unit 54. The two-dimensional code recognition unit 54 detects the two-dimensional code from the captured image (ACT104). The two-dimensional code recognition unit 54 acquires image information and destination information represented by the detected two-dimensional code. An email address represented by the destination information is an email address of the image processing apparatus 200. The two-dimensional code recognition unit 54 outputs the image information and the destination information to the email control unit 55. The email control unit 55 generates an email including the image information in a text (ACT105). The email control unit 55 transmits the generated email to the email address of the image processing apparatus 200 represented by the destination information (ACT106).

The email control unit 263 of the image processing apparatus 200 receives the email transmitted from the user terminal 5 in ACT106 (ACT107). The email control unit 263 acquires image information included in a text of the received email. The email control unit 263 selects an image management record having the acquired image information referring to the image management table 221. The email control unit 263 acquires the image path from the selected image management record. The email control unit 263 acquires image data stored in the image path from the storage unit 220. The email control unit 263 generates an email (ACT108), and attaches the acquired image data (ACT109). The email control unit 263 transmits the generated email to the email address of the transmission source of the received email (ACT110).

The email control unit 55 of the user terminal 5 receives email transmitted from the image processing apparatus 200 (ACT111). The email control unit 55 acquires the image data attached to the received email (ACT112) and allows the image data to be stored in the storage unit 52.

The image processing apparatus 200 according to the first embodiment configured in this manner reads a sheet to generate image data. After generating the image data, the image processing apparatus 200 displays a two-dimensional code representing an email address of the image processing apparatus. A user transmits an email to the email address of the image processing apparatus 200 by reading the two-dimensional code using the user terminal 5. Therefore, the user does not need to manually input the email address of the image processing apparatus 200.

In addition, the image processing apparatus 200 transmits email with the image data attached to the email address of the transmission source of the email transmitted from the user terminal 5. Therefore, a user does not need to register an email address as a transmission destination of image data in the image processing apparatus 200 in advance.

The image processing apparatus 200 according to the first embodiment has the function described above, and thereby workload of a user related to an acquisition of the image data is reduced.

Next, a modification example of the first embodiment will be described.

The image processing apparatus 200 may determine a transmission destination of email to which image data is attached according to information included in the received email. For example, the user specifies an email address of a counterpart to whom the user wants to transmit image data in a Cc field, Bcc field, and the like of the email to be transmitted to the image processing apparatus 200. The image processing apparatus 200 transmits the email with the image data is attached to the email address of the transmission source of the received email. Furthermore, the image processing apparatus 200 transmits the email to which image data is attached even to an email address specified in the Cc field, Bcc field, and the like of the received email. The user may easily transmit the acquired image data to a plurality of counterparts by the processing described above. Moreover, for example, the email address specified in the Cc field, Bcc field, and the like may be described instead in a text of email. In this case, a format which allows the email address described in the text of email to be interpreted as an email address of the transmission destination may be provided.

The image processing apparatus 200 may be configured as a device which is integrated with the access point 4.

(Second Embodiment)

Figure 7:
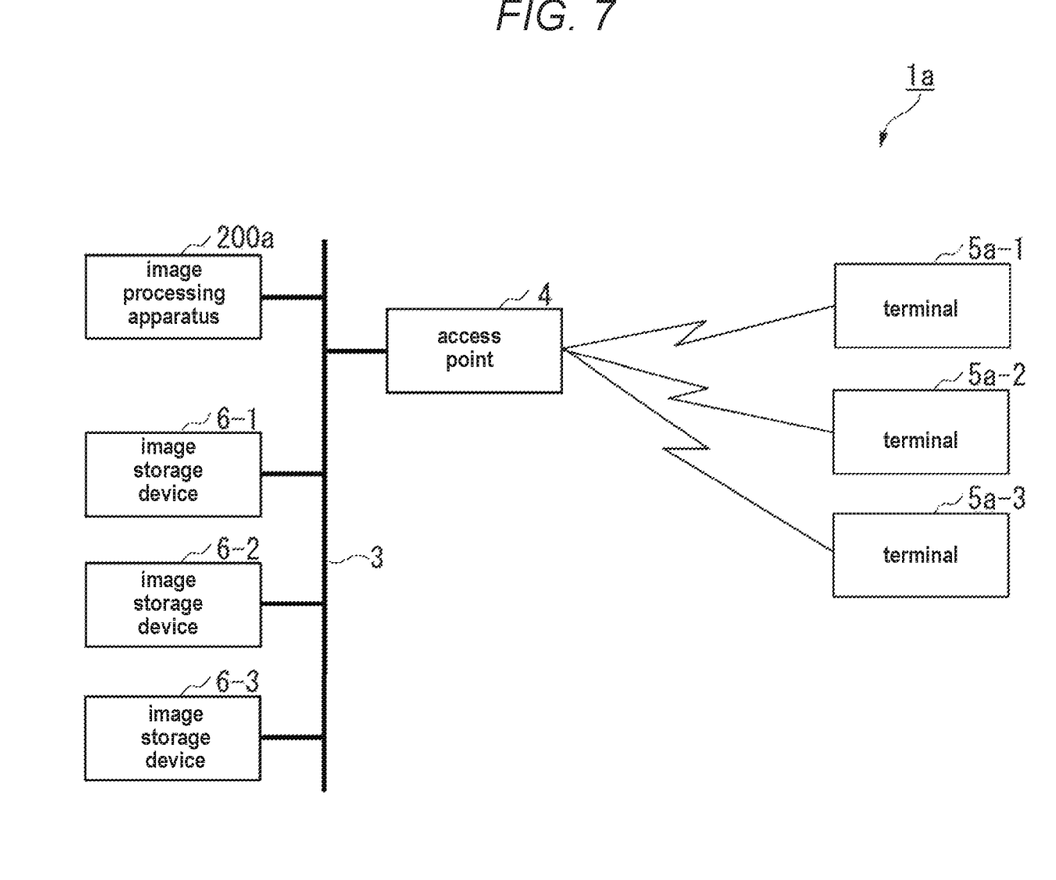
FIG. 7 is a diagram illustrating a configuration of an image processing system, according to a second embodiment.

FIG. 7 is a diagram illustrating a configuration of an image processing system la according to a second embodiment.

The image processing system la includes an image processing apparatus 200*a* (instead of the image processing apparatus 200 of the image processing system 1). Moreover, the image processing system 1a includes user terminals 5a-1 to 5a-3 (instead of user terminals 5-1 to 5-3 of the image processing system 1). In addition, the image processing system 1a includes image storage devices 6-1 to 6-3 (which are not included in the image processing system 1).

The image processing apparatus 200a communicates with the image storage devices 6-1 to 6-3 through a network 3. The image processing apparatus 200a transmits image data generated by reading a sheet to any one of the image storage devices 6-1 to 6-3.

The user terminals 5a-1 to 5a-3 communicate with the image storage devices 6-1 to 6-3 through an access point 4. In the following description, when not particularly distinguished, the user terminals 5a-1 to 5a-3 are referred to as a user terminal 5a.

The image storage devices 6-1 to 6-3 acquire image data transmitted from the image processing apparatus 200a to store the image data. In an example of FIG. 7, three image storage devices 6 are illustrated, however, the image storage devices 6-1 to 6-3 are referred to as the image storage device 6, when not particularly distinguished in the following description. The number of the image storage devices 6 may be different from the number illustrated in FIG. 7.

Figure 8:
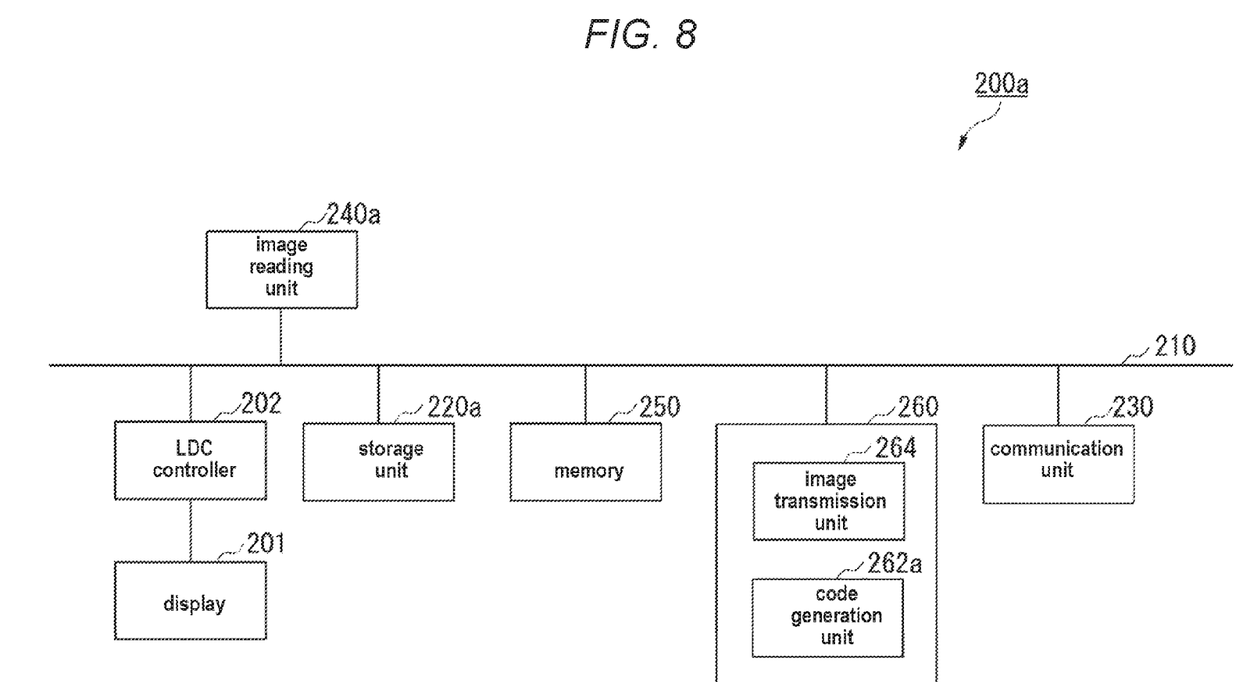
FIG. 8 is a block diagram illustrating a functional configuration of an image processing apparatus, according to the second embodiment.

FIG. 8 is a block diagram illustrating a functional configuration of the image processing apparatus 200a.

The image processing apparatus 200a includes a storage unit 220a (instead of the storage unit 220 of the image processing apparatus 200). Moreover, the image processing apparatus 200a includes an image reading unit 240a (instead of the image reading unit 240 of the image processing apparatus 200). The image processing apparatus 200a also includes an image transmission unit 264 (instead of the image management unit 261 of the image processing apparatus 200). The image processing apparatus 200a also includes a two-dimensional code generation unit 262a (instead of the two-dimensional code generation unit 262). Moreover, the image processing apparatus 200a does not include an email control unit 263 which is included in the image processing apparatus 200.

The storage unit 220a is different from the storage unit 220 in that the storage unit 220a includes an image storage device table 221a instead of the image management table 221.

Figure 9:
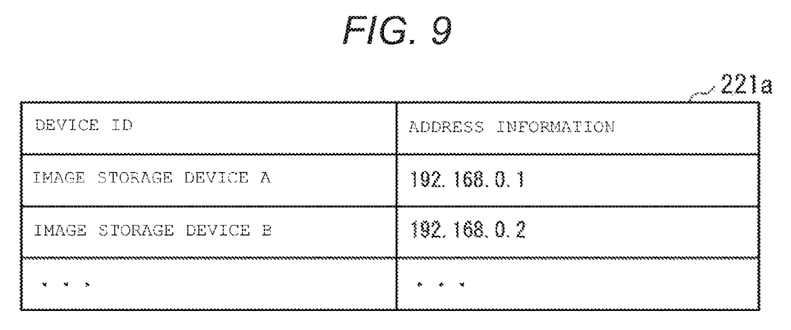
FIG. 9 illustrates an example of an image storage device table, according to the second embodiment.

FIG. 9 illustrates an example of the image storage device table 221a. The image storage device table 221a includes an image storage device record for each device ID. The image storage device record includes the device ID and address information. The device ID is identification information of the image storage device 6. The address information is position information of the corresponding image storage device 6 on a network, as specified by the device ID. For example, the position information on a network is information such as Internet Protocol (IP) address. The image storage device record is registered in advance in the image storage device table 221a.

The description now returns to FIG. 8.

The image reading unit 240a reads a sheet (which is an object to be read) and generates image data. The image reading unit 240a outputs the acquired image data to the image transmission unit 264.

When the image data is output from the image reading unit 240a, the image transmission unit 264 generates path information of the image data. The path information is information of a path at which the image data is stored in the image storage device 6. The image transmission unit 264 refers to the image storage device table 221a and selects the image storage device 6 that is a transmission destination of the image data. The selected image storage device 6 may be selected according to a desired criteria such as a load situation of the image storage device 6, and a disk usage amount. The image transmission unit 264 acquires address information from an image storage device record corresponding to the selected image storage device 6. The image transmission unit 264 transmits image data to the position information represented by the acquired address information. At this time, the image transmission unit 264 transmits both image data and path information of the image data.

The two-dimensional code generation unit 262a generates a two-dimensional code which represents position information and path information of the image storage device 6 to which image data is transmitted. The two-dimensional code generation unit 262a outputs the generated two-dimensional code to the LCD controller 202 and allows the code to be displayed on the display 201.

Figure 10:
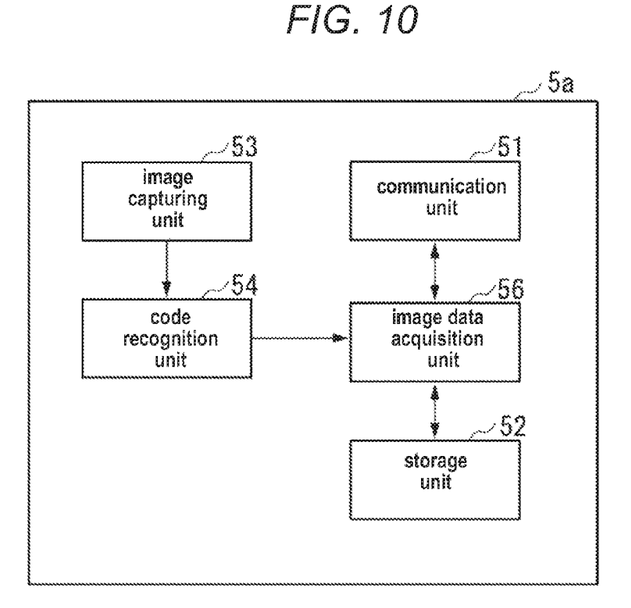
FIG. 10 is a block diagram illustrating a functional configuration of a user terminal, according to the second embodiment.

FIG. 10 is a block diagram illustrating a functional configuration of the user terminal 5a.

The user terminal 5a is different from the user terminal 5 in that the user terminal 5a includes an image data acquisition unit 56 instead of the email control unit 55.

The image data acquisition unit 56 acquires image data based on the path information and position information acquired from the two-dimensional code recognition unit 54. More specifically, the image data acquisition unit 56 requests transmission of image data stored in a location represented by the path information to the image storage device 6, the path information being included in the position information.

Figure 11:
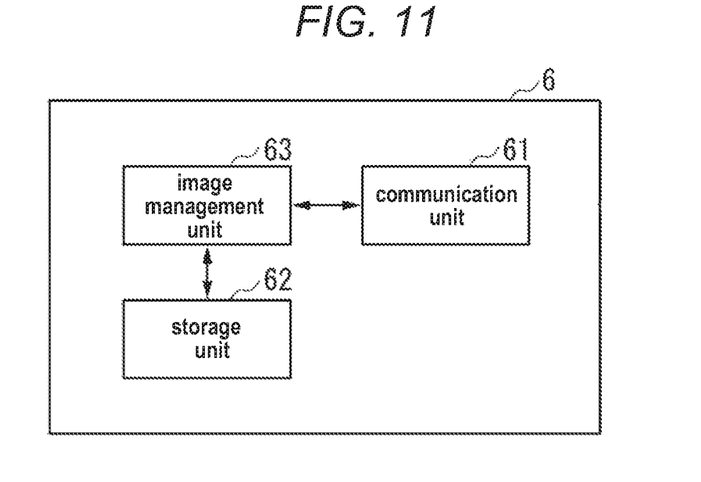
FIG. 11 is a block diagram illustrating a functional configuration of an image storage device, according to the second embodiment.

FIG. 11 is a block diagram illustrating a functional configuration of the image storage device 6.

The image storage device 6 includes a CPU, a memory, an auxiliary storage device, and the like. The CPU and the memory are connected by a bus. The CPU performs by reading an image providing program in the memory. Additionally, the image storage device 6 includes a communication unit 61, a storage unit 62, and an image management unit 63. The image providing program controls each functional unit described above.

All or a portion of each function of the image storage device 6 may be achieved using hardware such as ASIC, PLD, and FPGA. The image providing program may be stored in a computer-readable recording medium. For example, the computer-readable recording medium may be a portable medium such as a flexible disk, a magneto-optical disk, a ROM, or a CD-ROM. Moreover, the computer-readable recording medium may be, for example, a storage device such as a hard disk embedded in the computer system. The image providing program may be transmitted through the electric communication circuit.

The communication unit 61 includes a communication interface such as a LAN. The communication unit 61 communicates with the image processing apparatus 200a and the access point 4 through the network 3.

The storage unit 62 includes a storage device such as a magnetic hard disk device, and a semiconductor memory device. The storage unit 62 stores image data transmitted from the image processing apparatus 200a.

The image management unit 63 receives image data and path information of the image data transmitted from the image processing apparatus 200a. The image management unit 63 outputs the received image data to the storage unit 62 and stores the image data in a location represented by the path information. In addition, the image management unit 63 acquires requested image data from the storage unit 62 and transmits the image data to the user terminal 5a according to a request of the user terminal 5a.

Figure 12:
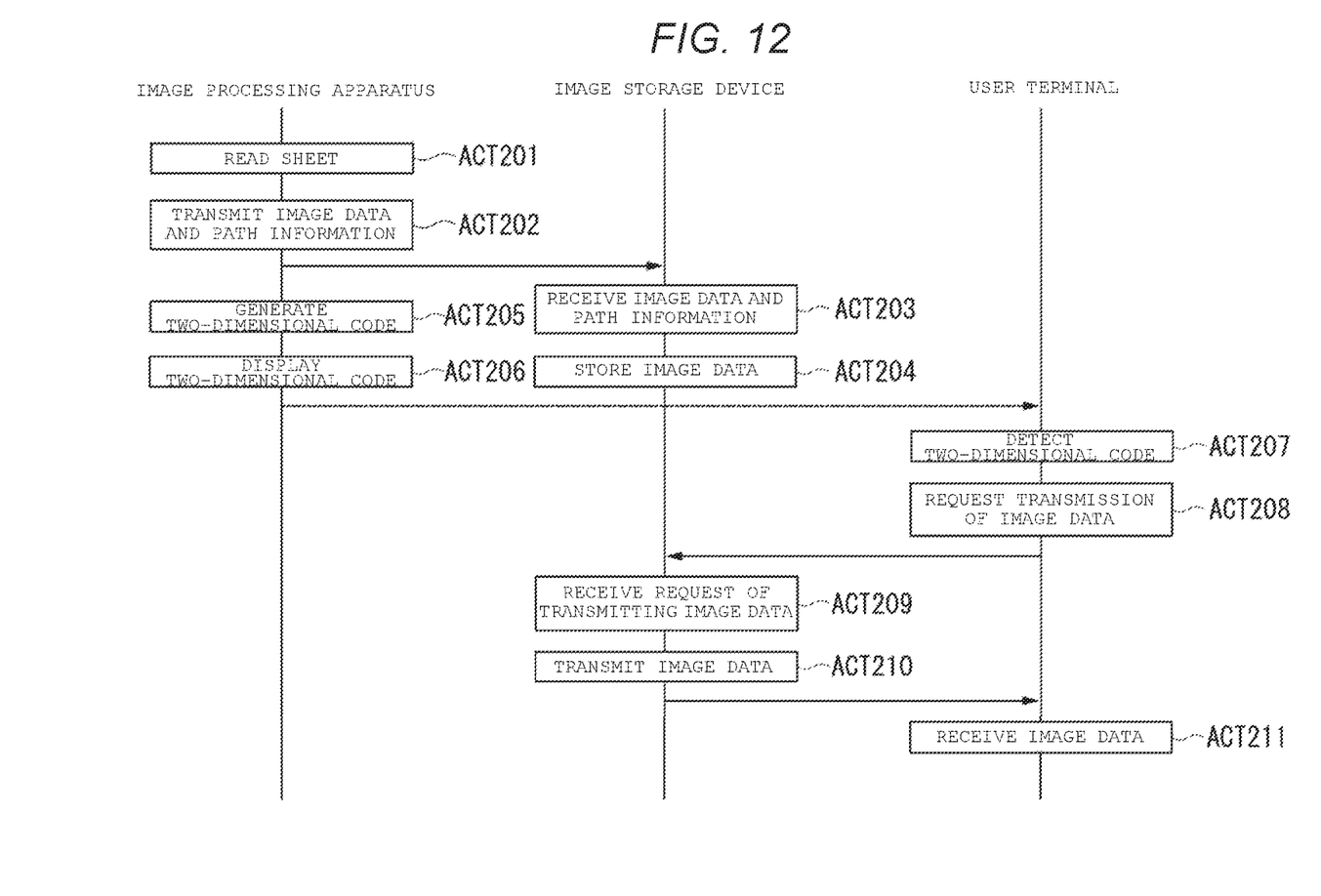
FIG. 12 is a flowchart illustrating a flow of transmission processing of image data in the image processing system, according to the second embodiment.

FIG. 12 is a flowchart illustrating a flow of transmission processing of image data in the image processing system 1a according to the second embodiment.

First, a user sets a sheet (which is an object to be read) in the image reading unit 240a of the image processing apparatus 200a. The image reading unit 240a reads an image of the set sheet (ACT201) to generate image data. The image reading unit 240a outputs the acquired image data to the image transmission unit 264.

When image data is output from the image reading unit 240a, the image transmission unit 264 generates path information of the image data. Then, the image transmission unit 264 refers to the image storage device table 221a and selects the image storage device 6 as a destination that the image data is transmitted to. The image transmission unit 264 acquires the address information from an image storage device record corresponding to the selected image storage device 6. The image transmission unit 264 transmits the image data and path information of the image data to a destination represented by the value of the acquired address information (ACT202).

The image management unit 63 of the image storage device 6 receives image data and path information (ACT203). The image management unit 63 outputs the image data to the storage unit 62 and stores the image data in a location represented by the path information (ACT204).

When processing of ACT202 is completed, the image transmission unit 264 of the image processing apparatus 200a outputs the position information and path information to the two-dimensional code generation unit 262a. The two-dimensional code generation unit 262a generates a two-dimensional code which represents the position information and path information (ACT205). The two-dimensional code generation unit 262a outputs the generated two-dimensional code to the LCD controller 202. The LCD controller 202 displays the two-dimensional code on the display 201 (ACT206).

A user inputs an operation to capture the two-dimensional code displayed on the display 201 using the user terminal 5a. An image capturing unit 53 of the user terminal 5a captures an image of a space in which the image processing apparatus is placed by a capturing operation initiated by the user. The image capturing unit 53 outputs the acquired captured image to the two-dimensional code recognition unit 54.

The two-dimensional code recognition unit 54 detects a two-dimensional code from the captured image (ACT207). The two-dimensional code recognition unit 54 acquires the position information and path information represented by the detected two-dimensional code. The two-dimensional code recognition unit 54 outputs the position information and the path information to the image data acquisition unit 56. The image data acquisition unit 56 requests transmission of the image data stored in a location represented by the path information from the image storage device 6 represented by the position information (ACT208).

The image management unit 63 of the image storage device 6 receives the request of to transmit image data (ACT209).

The image management unit 63 acquires the requested image data from the storage unit 62 and transmits the image data to the user terminal 5a (ACT210). The user terminal 5a receives the image data (ACT211), and outputs the image data to the storage unit 52.

The image processing apparatus 200a according to the second embodiment configured in this manner reads a sheet to generate image data, and transmits the image data to the image storage device 6. When transmitting the image data, the image processing apparatus 200a displays a two-dimensional code which represents the image storage device 6 which stores the image data and the location in which the image data is stored. A user requests transmission of the image data to the image storage device 6 which stores the image data by reading the two-dimensional code using the user terminal 5a. Therefore, the user does not need to manually input information which represents the image storage device 6 storing the image data and the location in which the image data is stored.

The image processing apparatus 200a according to the second embodiment has the function described above, and thereby workload of a user related to an acquisition of the image data is reduced.

Next, a modification example according to the second embodiment will be described.

The image processing apparatus 200a may transmit image data to a plurality of the image storage devices 6-1 to 6-3.

An existing file providing function may be used by the image storage device 6 to transmit the requested image data to the user terminal 5a. For example, this function may be included when the image storage device 6 functions as a file server. In addition, this function may be included, for example, when the image storage device 6 functions as a Hyper Text Transfer Protocol (HTTP) server. When the image storage device 6 functions as an HTTP server, authentication of the user terminal 5a may be performed by a POST request. For example, the image processing apparatus 200a may include account information and password information which are valid only for an acquisition of image data in a two-dimensional code. The user terminal 5a acquires the information from the two-dimensional code, and transmits the information by including this in the POST request, and thereby the user terminal 5a may be authenticated by the HTTP server.

The access point 4 may be a network device with wired connection such as bridges, and routers.

The image storage device 6 may be in a network different from the image processing apparatus 200a. In this case, the image storage device 6 may be configured to be capable to communicate with the image processing apparatus 200a through a network device such as a router and a switch.

The location in which the image data is stored may be determined by the image storage device 6. In this case, the image processing apparatus 200a may acquire path information from the image storage device 6. Moreover, the path information may not be information which directly represents the location in which the image data is stored. For example, the image processing apparatus 200a or the image storage device 6 may include a table which associates a storage location of the image data with identification information of the storage location. In this case, for the path information, the identification information which is associated with the storage location of the image data may be used.

Moreover, codes generated by the two-dimensional code generation units 262 and 262a are not limited to two-dimensional codes. For example, the codes generated by the two-dimensional code generation units 262 and 26227 a may be one-dimensional codes such as a bar code.

According to at least one embodiment described above, an image processing apparatus of the embodiment displays a two-dimensional code. The displayed two-dimensional code is input by a user to a user terminal so as to acquire image data. Thereby workload of the user related to an acquisition of the image data may be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
an image reading sensor configured to read an image from a sheet to generate image data;
a display device;
a communication interface; and
a processor configured to:
generate a code that can be scanned to determine an email address of the image processing apparatus,
control the display device to display the code so that a user can scan the code on the display device with a user terminal,
control the communication interface to receive an email transmitted from the user terminal that scanned the code to the email address of the image processing apparatus,
based on the received email, identify the image data and the email address of the user terminal, and
control the communication interface to transmit an email, with the image data attached, to the identified email address of the user terminal.

2. The apparatus according to claim 1, wherein the code further represents authentication information for authenticating the user terminal when the user terminal scans the code to request transmission of the image data.

3. The apparatus according to claim 1, wherein:
the code further represents identification information of the image data, and
the image data attached to the email transmitted by the communication interface corresponds to the identification information represented by the code.

4. The apparatus according to claim 3, further comprising:
a memory storing an image management table that associates information representing a storage place of the image data with the identification information,
wherein the processor is further configured to refer to the image management table, retrieve the image data from the storage place indicated by the information associated with the identification information, and attach the retrieved image data to the email to be transmitted to an email address of the user terminal.

5. The apparatus according to claim 1, wherein the processor is further configured to determine an email address of the user terminal according to information included in the received email.

6. The apparatus according to claim 5, wherein the processor is further configured to transmit the email with the image data to a plurality of transmission destinations including the user terminal.

7. The apparatus according to claim 6, wherein an email address of at least one of the plurality of transmission destinations other than the user terminal is included in one of a Cc and a Bcc field in the received email.

8. An image processing method comprising the steps of:
reading an image from a sheet to generate image data;
storing the image data in a storage location;
generating a code that can be scanned to determine the storage location;
displaying the code on a display device so that a user can scan the code on the display device with a user terminal;
receiving an email transmitted from the user terminal that scanned the code;
based on the received email, identifying the image data and an email address of the user terminal; and
transmitting an email with the image data attached to the identified email address of the user terminal.

9. The method according to claim 8, wherein the image is read in an image forming apparatus and the storage location is in a storage device external to the image forming apparatus.

10. The method according to claim 9, wherein the code further represents an identification of the storage device and position information of the storage device on a network.

11. The method according to claim 8, wherein the image is read in an image forming apparatus and the storage location is in a storage device internal to the image forming apparatus.

12. The method according to claim 8, wherein the storage location is a storage device that receives the email transmitted from the user terminal.

13. The method according to claim 8, wherein:
the storage location is one of a plurality of storage devices, and
the storage location is selected for storing the image data therein according to a state of the plurality of storage devices.

14. The method according to claim 8, wherein the code further represents authentication information for authenticating the user terminal that receives the email with the attached image data.

15. An image processing method comprising the steps of:
scanning, with a user terminal, a code representing a storage location of image data read from a sheet, wherein the storage location is external to the user terminal and the code is scanned from a display different from a display of the user terminal;
determining, based on the scanned code, the storage location of the image data;
transmitting, from the user terminal to the storage location represented by the code, a request for transmission of the image data stored in the storage location represented by the code; and
receiving the image data on the user terminal.

16. The method according to claim 15, wherein:
the code is scanned from a display of an image forming device that has read the image data, and
the storage location is in a storage device external to the image forming apparatus.

17. The method according to claim 16, wherein the code further represents an identification of the storage device and position information of the storage device on a network.

18. The method according to claim 15, wherein:
the code is scanned from an image forming device that has read the image data, and
the storage location is in a storage device internal to the image forming apparatus.

19. The method according to claim 15, wherein the code further represents authentication information for authenticating the user terminal when the user terminal scans the code to request transmission of the image data.

20. The method according to claim 15, further comprising:

determining from the code an email address of the storage place for transmitting the email.

\* \* \* \* \*